3,046,168
CHEMICALLY PRODUCED COLORED SMOKES
Lohr A. Burkardt, 52–B Rodman, William G. Finnegan, 202–B Byrnes, and Rex L. Smith, 408–B Forrestal, all of China Lake, Calif.
No Drawing. Filed Oct. 16, 1958, Ser. No. 767,751
4 Claims. (Cl. 149—42)
(Granted under Title 35, U.S. Code (1952), sec. 266)

The invention described herein may be manufactured and used by or for the Government of the United States of America for governmental purposes without the payment of any royalties thereon or therefor.

The present invention is directed to pyrotechnic compositions for chemically producing colored smokes, and to certain applications thereof.

In the past, pyrotechnic compositions used for colored smoke production have relied upon the dispersion of heat- and oxidation-resistant dyes contained therein, produced either by the use of a charge of high explosive or by volatization of the dye by the heat produced during the burning of the composition.

Such compositions are characterized by the destruction of part of the dye during the dispersion process. Such compositions do not produce enough smoke per unit volume of pyrotechnic employed nor is the smoke produced fast enough to be satisfactory in certain applications such as rocket tracers and quick firing signals, especially the latter.

It is therefore a object of this invention to provide pyrotechnic compositions which produce colored smokes which are not destroyed by the heats of reaction of the compositions.

Another object is to produce more persistent smokes than prior art compositions.

Still another object is to produce smokes having more intense colors, especially at high altitudes.

Other objects and features of this invention will become apparent to those skilled in the art as the disclosure is made in the following detailed description.

The invention contemplates the incorporation of an iodine-base oxidizer with a suitable fuel so that upon combustion or detonation of the composition, either iodine or colored metallic iodides or both are formed, these materials being dispersed by the heat of the reaction. The color of the smoke is due to the reaction products which cannot be destroyed by the heat therefrom.

The oxidizer utilized is either iodic acid, iodine pentoxide, or a heavy metal iodate, including iodates of lead, silver, and mercury. When reacted with a suitable fuel binder such as a polytetrazole resin, for example, poly-2-methyl-5-vinyltetrazole, elemental iodine is produced. When oxidizer-light metal mixtures are used a small amount of a conventional binder for this application may be used. Examples of such binders are epoxy resins, polyurethane resins, "Thiokol" resins (polyfunctional mercaptans) or a natural resin, such as, gum arabic. The reaction is believed to be as follows:

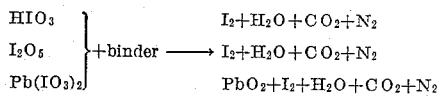

The incorporation of a quantity of light metal including aluminum, magnesium, titanium, boron, and zirconium, or hydrides of such metals, into the binder-oxidizer mixture results in the production of elemental iodine when non-heavy metal iodate oxidizers are used, according to the following typical reaction:

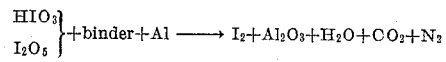

When a heavy metal iodate is incorporated with the binder and light metal, it is possible to produce both a heavy metal iodide and elemental iodine, but it is difficult to produce only one or the other at will. However, if an unstable heavy metal iodide is formed, it will be decomposed to elemental metal and iodine by the heat of the reaction which is highly exothermic, especially so since the combustion of a light metal such as aluminum or magnesium releases large quantities of heat.

In the case where silver iodate is used as the oxidizer, silver iodide is one of the reaction products and is not fully decomposed by the heat of the reaction. The applications of silver iodide in cloud seeding are well known. Thus a rocket carrying such a tracer fired into a cloud is an excellent vehicle for seeding clouds.

The function of the binder when used with the light metal-oxidizer mixture is to hold the formulation together and to assist in the dispersion of the colored combustion products by rapid gas production but it can be eliminated and the iodate-fuel used in powder form in certain applications.

The color of the smokes produced depends upon the color of the particular reaction products. Iodine vapor is reddish-brown in appearance at low altitudes, but at higher altitudes where subjected to ultra-violet radiation is purple in appearance and exceptionally visible. The heavy metal iodides are yellow, aluminum oxide is white, silver oxide is black. The color of the smoke cannot always be predicted but the color of the smoke is not the novel feature of this invention.

In the fuel binder-oxidizer system, the content of the fuel binder may range from about 5 to about 50% depending upon the oxygen balance of the binder. In practice, a particular binder is chosen and then enough oxidizer added so that the system as a whole is oxygen balanced. However, an excess of either would not be deleterious.

In the binder-oxidizer-light metal system, the content of the metal fuel can range from about one-half the stoichiometric amount to about twice stoichiometric for a given amount of oxidizer. Then a few percent excess binder is added to hold the composition together, from as little as about 0.5 to about 5%. More binder can be used, however, without any deleterious effects.

The oxidizer-light metal system is useful with a metal content ranging from about one-half stoichiometric to twice stoichiometric.

The fuel binder-oxidizer system and the binder-oxidizer-light metal system are both relatively slow burning, although the latter burns faster than the former. Both systems are suitable for continuous smoke production.

The light metal-iodate system is very fast in reacting and is suitable for producing a sudden puff of smoke.

Ignition of the present formulations is accomplished either by a conventional squib or other suitable ignition device or by exploding a small charge or explosive in close proximity thereto.

The formulations which include the binder are easily made by placing the finely divided solid components in a vessel and pouring in a solution of binder in a solvent until the correct proportion of binder is present, thoroughly mixing the resulting slurry, and then allowing the solvent to evaporate, whereby a cake is left. The cake is then crumbled and loaded into trace bodies or smoke puff charges when used in rocket application.

The light metal-iodate systems are made by sifting the divided solids through 100 mesh screens and thoroughly blending them. The material can then be loaded into a container surrounding an explosive charge, and is then ready for use.

The following examples are given to more particularly illustrate the invention:

*Example 1.*—A mixture of 88.4% lead iodate and 11.6% poly 2-methyl-5-vinyltetrazole made by evaporating the solvent from a suspension of the iodate in a solution of the polymer in methylene chloride was pressed into sector tracer bodies for the 2.75″ diameter rocket. These sector bodies were each attached to a rocket. Two rockets were static fired and one fired in free flight. Red smoke was produced in each case in copious amounts.

*Example 2.*—A mixture of 22.5% aluminum and 77.5% lead iodate which had been sieved through a 100 mesh screen and blended by shaking was loaded in two equal parts, about 90 grams each, into opposite arms of a standard smoke marker. A 60 gram pellet of tetryl was placed between the arms and detonated, resulting in a large cloud of red smoke.

*Example 3.*—A mixture of 25% zirconium hydride and 75% lead iodate was made and tested in the same manner as in the preceding example. A large reddish-purple smoke cloud resulted.

The samples were all tested for sensitivity to friction, drop, and electricity and are well within the safety requirements of a military pyrotechnic.

Poly-2-methyl-5-vinyltetrazole has not been reported in the literature and is made as follows: A mixture of 213 g. (3.0 moles) of hydracrylontrile, 214.8 g. (3.3 moles) of sodium azide, 176.7 g. (3.3 moles) of ammonium chloride and 1500 ml. of dimethylformamide is heated at 123°–127° C. with stirring for 24 hours. The dimethylformamide is then removed at 100° C. under reduced pressure (ca. 20 mm.). Care should be taken to remove the dimethylformamide in this operation as completely as possible. The residue of sodium chloride and 5-hydroxyethyltetrazole is then dissolved in 250 ml. of water and made basic with a solution of 140 g. (3.5 moles) of sodium hydroxide in 250 ml. of water. The temperature should be maintained at ca. 25° C. during this step to prevent excessive foaming. The solution is then stripped to about half volume at reduced pressure on a steam bath. The pH of the solution at this time should be 9 or higher. If the pH is lower than 9, additional base should be added and the evaporation continued until the pH remains at 9 or higher. The solution is then cooled to room temperature and acidified to about pH 2 with 300 ml. of concentrated hydrochloric acid (or more if additional base had been used). It is advantageous at this point to cool the solution to 5° C. and remove the precipitated sodium chloride by filtration. The filter cake is washed with 95% ethanol and the filtrate combined with the product solution. The acidified product solution and alcohol washings are then stripped of solvents at 100° C. under reduced pressure. The 5-hydroxyethyltetrazole is then extracted from the residue with one 500 ml., one 250 ml. and one 125 ml. portions of cold 95% ethanol and neutralized to a phenolphthalein endpoint by the addition of a solution of 197.4 g. (3.0 moles) of 85% potassium hydroxide in 625 ml. of 95% ethanol with stirring and cooling.

The 3.0 moles of potassium 5-hydroxyethyltetrazole in 1500 ml. of 95% ethanol from the previous reaction is placed in a 3 liter, 3 necked flask.

Potassium bicarbonate (30 g., 0.3 mole) is added and 417 g. (3.3 moles) of dimethyl sulfate is added dropwise with stirring over a 30 minute period. The temperature of the solution is maintained at 28°–33° C. during the addition and for an additional 30 minutes and then raised to 40°–45° C. for 30 minutes. The solution is then cooled to 5° C. The precipitate of potassium methylsulfate is removed by filtration and the filter cake is washed with several portions of 95% ethanol. The combined ethanol filtrates are evaporated to dryness at reduced pressure on a steam bath.

The 1- and 2-methyl-5-(2-hydroxethyl)tetrazoles are extracted from the residue with a total of 350 ml. of chloroform and the chloroform solution is dried for one hour with magnesium sulfate, or alternatively by azeotropic distillation of part of the chloroform. (If the vacuum stripping of the ethanol and water in the previous step is thorough, the chloroform solution should be essentially dry. Care should be taken that the chloroform solution is dry before the chlorination reaction.)

The solution of 1- and 2-methyl-5-(2-hydroxyethyl)tetrazoles in 350 ml. of chloroform from the preceding methylation reaction is cooled to 5° C. and 330 ml., 537 g. (4.5 moles) of thionyl chloride is added with stirring at a rate such that the reaction temperature does not rise above 25° C. The solution is then heated to reflux for four hours, or longer if necessary, to complete the evolution of hydrochloric acid and sulfur dioxide. The chloroform and excess thionyl chloride are then removed at reduced pressure on a steam bath. The heating at reduced pressure should be thorough to ensure complete removal of any thionyl chloride, but it is also essential that there be excess thionyl chloride at the end of the reflux period. The residue of products is then cooled to room temperature and dissolved in 300 ml. of chloroform. Water (200 ml.) is added and the mixture is stirred and cooled to 5° C. Solid sodium bicarbonate is then added, with stirring and cooling in sufficient quantity (0.2–0.3 mole/mole) to bring the pH of the mixture to 6–7. The chloroform layer is then separated and the water layer is extracted with an additional 100 ml. portion of chloroform. The combined chloroform solutions are dried with magnesium sulfate and stripped to dryness at reduced pressure on a steam bath. The residue of mixed 1- and 2-methyl-5-(2-chloroethyl)tetrazoles is then heated to 100° C. at 10–20 mm. pressure and stripped of the low boiling impurties present . 2-methyl-5-(2-chloroethyl)tetrazole is then removed from the mixture of chloro compounds by high vacuum distillation.

The 2-methyl-5-(2-chloroethyl)tetrazole from the preceeding reaction is dissolved in 250 ml. of methanol and the solution is heated to reflux. A solution of approximately 98.5 g. (1.5 moles) of 85% potassium hydroxide in 400 ml. of methanol is then added dropwise with stirring over a period of one hour and the reaction is stirred and refluxed for an additional hour. The solution is then cooled to room temperature, neutralized to pH 6–7 with concentrated hydrochloric acid and one gram of hydroquinone is added. The methanol is removed by distillation at atmospheric pressure on a steam bath. The residue of salts and products is cooled to room temperature and the products are extracted with one 150 ml. and two 50 ml. portions of methylene chloride. The methylene chloride solution is dried with magnesium sulfate and the solvent is removed by distillation at atmospheric pressure on a steam bath. The 2-methyl-5-vinyltetrazole is removed from the mixture of crude products by distillation at 20 mm. pressure; B.P. ca. 80° C., $N_D^{25}$ 1.4800.

Emulsion polymerization of this monomer is accomplished as follows: 11 g. (0.1 mole) of 2-methyl-5-vinyltetrazole is added with stirring to a solution of 15 drops of sorbitan trioleate in 80 ml. of distilled water. Nitrogen is bubbled through the water during the formation of the emulsion and the duration of the polymerization. The emulsion is cooled to 0–2° C. in an ice bath. One ml. of a solution of 0.03 g. of ferrous sulfate heptahydrate in 100 ml. of distilled water is added, followed by 0.025 g. of ammonium persulfate and 0.025 g. of sodium metabisulfite. The temperature is maintained at 1–2° C. After 24 hours, the conversion to polymer is estimated at 30–50% and after 46 hours the conversion appeared reasonably complete, although some odor of monomer was still present. The polymer is a solid rubbery mass at this point. The product is kneaded under distilled water unitl free of soap and inorganic salts, cut into small pieces and dried. The dried polymer is dissolved in 250 ml. of ethylene dichloride and precipitated into 500 ml. of cyclohexane. The polymer is removed by filtration and dried. Intrinsic viscosities in chloroform at 25° C. for polymers from various batches prepared as above varied from 3.910 to 4.232 depending upon the batch.

From the foregoing it is seen that the instant invention is superior to prior pyrotechnics in that the color of smoke is not diminished by the heat of the reaction because the reaction products themselves make the color. Thus a very energetic composition will not destroy the color.

Obviously many modifications and variations of the present invention are possible in the light of the above teachings. It is therefore to be understood that within the scope of the appended claims the invention may be practiced otherwise than as specifically described.

What is claimed is:

1. A pyrotechnic composition consisting essentially of about 70 to about 90 weight percent of an iodine-containing oxidizing agent from the class consisting of iodic acid, iodine pentoxide, lead iodate, silver iodate and mercury iodate, and about 10 to about 30 weight percent of a fuel from the class consisting of aluminum, magnesium, titanium, boron, zirconium, hydrides of said metals, polyvinyltetrazoles, lower alkyl substituted polyvinyltetrazoles, and mixtures thereof.

2. Claim 1 to which a small amount of binder from a class consisting of polyurethane resins, polysulfide resins, epoxy resins, gum arabic, and mixtures thereof has been added.

3. The composition of claim 1 in which the oxidizing agent is lead iodate and the fuel is poly-2-methyl-5-vinyltetrazole.

4. The composition of claim 1 in which the oxidizing agent is silver iodate and the fuel is poly-2-methyl-5-vinyltetrazole.

References Cited in the file of this patent

UNITED STATES PATENTS

| | | |
|---|---|---|
| 1,593,721 | Hendler | July 27, 1926 |
| 2,091,977 | Graff | Sept. 7, 1937 |
| 2,700,603 | Hart et al. | Jan. 25, 1955 |